US009146947B2

(12) United States Patent
Luk

(10) Patent No.: US 9,146,947 B2
(45) Date of Patent: *Sep. 29, 2015

(54) METHODS AND SYSTEMS FOR A CLOSEST MATCH SEARCH

(71) Applicant: eBay Inc., San Jose, CA (US)

(72) Inventor: Alpha Kamchiu Luk, San Jose, CA (US)

(73) Assignee: eBay Inc., San Jose, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 13/682,363

(22) Filed: Nov. 20, 2012

(65) Prior Publication Data
US 2013/0080442 A1 Mar. 28, 2013

Related U.S. Application Data

(63) Continuation of application No. 12/605,225, filed on Oct. 23, 2009, now Pat. No. 8,341,160.

(60) Provisional application No. 61/228,103, filed on Jul. 23, 2009.

(51) Int. Cl.
*G06F 17/30* (2006.01)
*G06Q 30/02* (2012.01)

(52) U.S. Cl.
CPC .... *G06F 17/30321* (2013.01); *G06F 17/30997* (2013.01); *G06Q 30/02* (2013.01)

(58) Field of Classification Search
CPC ........................ G06F 17/3002; G06F 17/30321
USPC .................................................. 707/741, 748
See application file for complete search history.

(56) References Cited

U.S. PATENT DOCUMENTS

| 7,516,130 | B2 * | 4/2009 | Ren et al. ............................... 1/1 |
| 8,341,160 | B2 | 12/2012 | Luk |
| 2007/0288602 | A1 * | 12/2007 | Sundaresan ................... 709/219 |
| 2009/0300014 | A1 * | 12/2009 | Chakrabarti et al. ............. 707/6 |
| 2011/0019925 | A1 | 1/2011 | Luk |

OTHER PUBLICATIONS

U.S. Appl. No. 12/605,225, Response filed Jan. 31, 2012 to Non Final Office Action mailed Oct. 31, 2011, 16 pgs.
U.S. Appl. No. 12/605,225, Corrected Notice of Allowability mailed Sep. 24, 2012, 5 pgs.
U.S. Appl. No. 12/605,225, Final Office Action mailed Apr. 16, 2012, 15 pgs.
U.S. Appl. No. 12/605,225, Non Final Office Action mailed Oct. 31, 2011, 12 pgs.

(Continued)

*Primary Examiner* — Apu Mofiz
*Assistant Examiner* — Cindy Nguyen
(74) *Attorney, Agent, or Firm* — Schwegman Lundberg & Woessner, P.A.

(57) ABSTRACT

A system to generate an index for a closest match search is described. The system receives a corpus of information that includes member information. The system parses the member information to generate signatures for each of the members and stores the signatures in the index. The signatures are unique to the members. Accordingly, the signatures signify the respective members. The system subsequently utilizes the index to identify input information that matches signatures in the index to identify a closest match of the input information to one or more members in the corpus of information.

20 Claims, 15 Drawing Sheets

(56) References Cited

OTHER PUBLICATIONS

U.S. Appl. No. 12/605,225, Notice of Allowance mailed Aug. 3, 2012, 7 pgs.

U.S. Appl. No. 12/605,225, Response filed Jul. 16, 2012 to Final Office Action mailed Apr. 16, 2012, 15 pgs.

U.S. Appl. No. 12/605,225, PTO Response to 312 Amendment mailed Nov. 26, 2012, 2 pgs.

* cited by examiner

METHODS AND SYSTEMS FOR A CLOSEST MATCH SEARCH

RELATED APPLICATIONS

This application is a continuation application which claims the priority benefits of U.S. application Ser. No. 12/605,225, filed Oct. 23, 2009, which claims the priority benefits of U.S. Provisional Application No. 61/228,103, filed Jul. 23, 2009, all of which are incorporated herein by reference in their entirety.

FIELD

Embodiments relate generally to the technical field of data communications and, in one example embodiment, to a closest match search.

BACKGROUND

An item may be identified as most closely matched to one or more known items. Such information may be helpful to determine whether a particular item resembles one or more known items. For example, an item that is listed for sale on a network-based marketplace may be identified as most closely matched to a known product from a catalogue of products. Improving the accuracy and efficiency of such identifications is a challenge to the present technology.

BRIEF DESCRIPTION OF DRAWINGS

The present disclosure is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present disclosure. It will be evident, however, to one of ordinary skill in the art that the present disclosure may be practiced without these specific details.

Closest Match Search Problems

Figure 1:
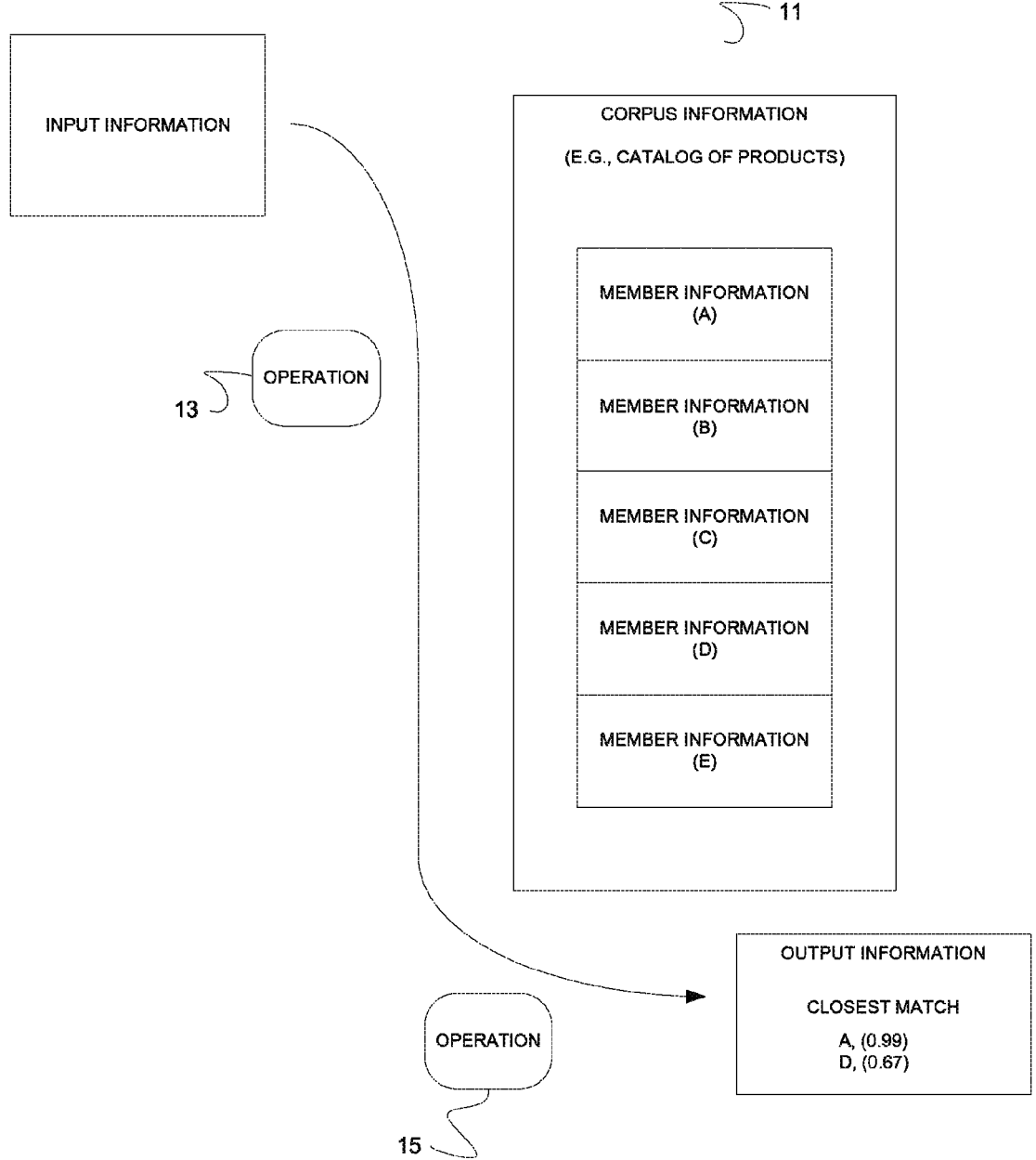
FIG. 1 is a diagram depicting a sequence of operations, according to one example embodiment, to execute a closest match search.

FIG. 1 is a diagram depicting a flow chart illustrating a sequence of operations 11, according to one example embodiment, to execute a closest match search. The sequence of operations 11 may be applied to a closest match search problem. The closest match search problem may be defined as finding an item(s) in a corpus (e.g., documents, web pages, listings, data items, etc.) which most closely resembles an input, with the finding based on a confidence score. Examples of the closest match search problems may include the following:

1. Document clustering/classification: given a document, find the document (or document class) in the corpus which most closely resembles the given document;
2. Attribute Extraction: given a listing title, find the attribute values in a catalog (or a list of values) which most closely resemble sections of the listing title. For example, in one embodiment, a listing may include listing information (e.g., text, image, picture, Uniform Resource Locator, etc.) that is descriptive of an item or service that is offered for sale or auction on a network-based marketplace. In one embodiment, the listing information may include a title.
3. Product Tagging: given a listing, find the product to catalog which most closely resembles the listing.

The sequence of operations 11 is shown to include input information that may be compared to corpus information in order to generate output information. The corpus information may include member information (A) through (E). The sequence of operations 11 may compare (operation 13) the input information to the respective member information to generate (operation 15) the output information. The output information may include member information that most closely matches the input information. For example, the members A and D most closely match the input information, with the member A being associated with a confidence score of 0.99 and the member D being associated with a confidence score of 0.67. Accordingly, the sequence of operations 11 may identify the member A as most closely matched to the input information and the member B as the next most closely matched to the input information. Further, the output information may include measures of confidence.

Figure 2:
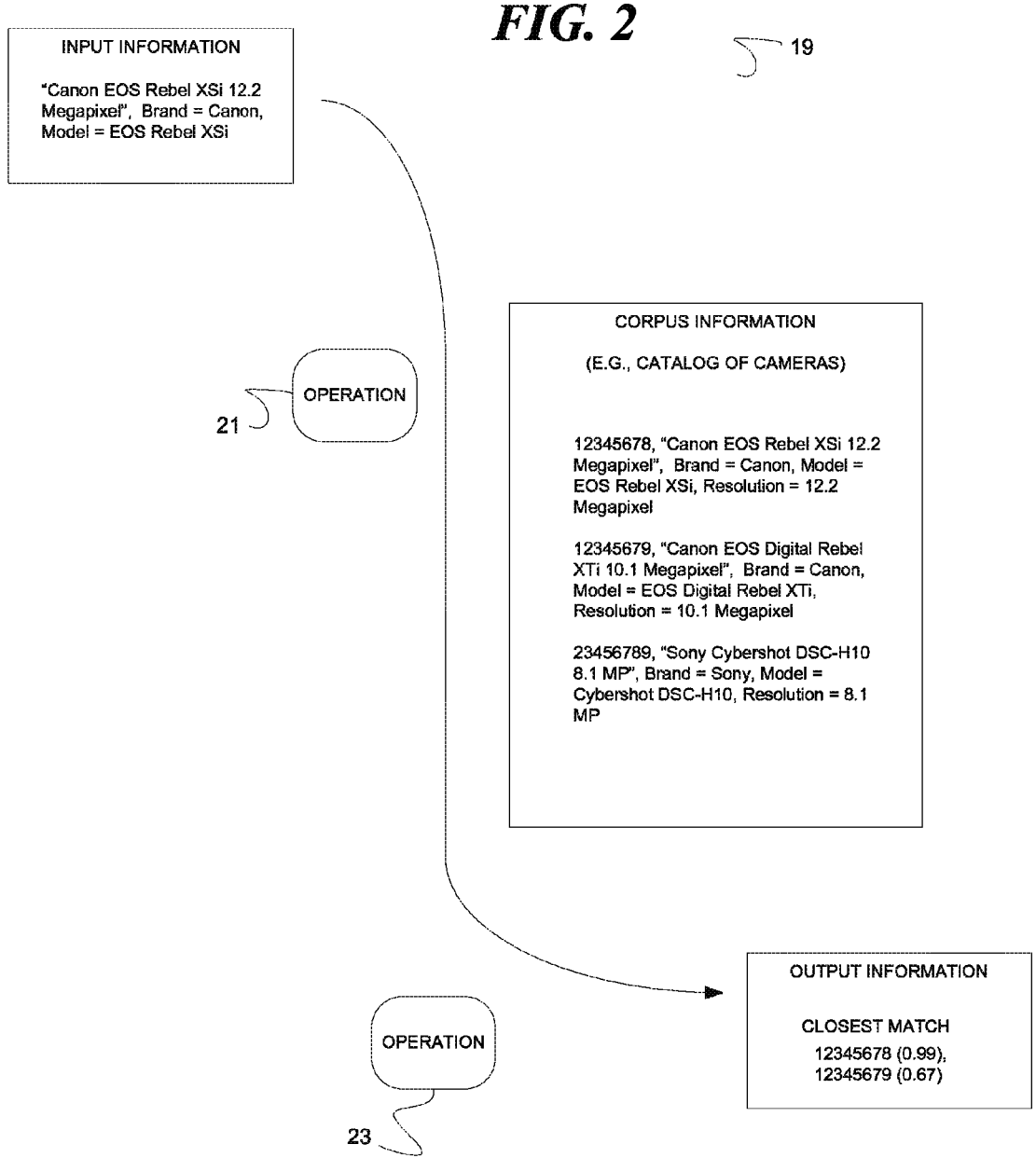
FIG. 2 is a diagram depicting a sequence of operations, according to one example embodiment, to execute a closest match search.

FIG. 2 is a diagram depicting a sequence of operations 19, according to one example embodiment, to execute a closest match search. The sequence of operations 19 provides a further example of a closest match search. The sequence of operations 19 is shown to include input information that may be compared (operation 21) to corpus information to generate (operation 23) output information. In one embodiment, the input information may include a listing describing an item for sale on a network-based marketplace. For example, the listing illustrated is for a camera and includes a title, "Canon EOS Rebel XSi 12.2 Megapixel." Further illustrated are attributes that may be embodied as name-value (NV) pairs. For example, a first NV pair is illustrated as "Brand=Canon" and a second NV pair is illustrated as "Model=EOS Rebel XSi." Other embodiments may not include NV pairs. The corpus information is shown to include a catalog of camera information. Each entry corresponds to a camera and may include an identifier, a title and one or more attributes (NV pairs). The output information may include member information that most closely matches the input information. For example, the members associated with member identifier 12345678 and member identifier 12345679 most closely match the input information, with the member 12345678 being associated with a confidence score of 0.99 and the member 12345679 being associated with a confidence score of 0.67. Accordingly, the sequence of operations 19 may identify the member 12345678 as most closely matched to the input information and the member 12345679 as the next most closely matched to the input information.

Figure 3:
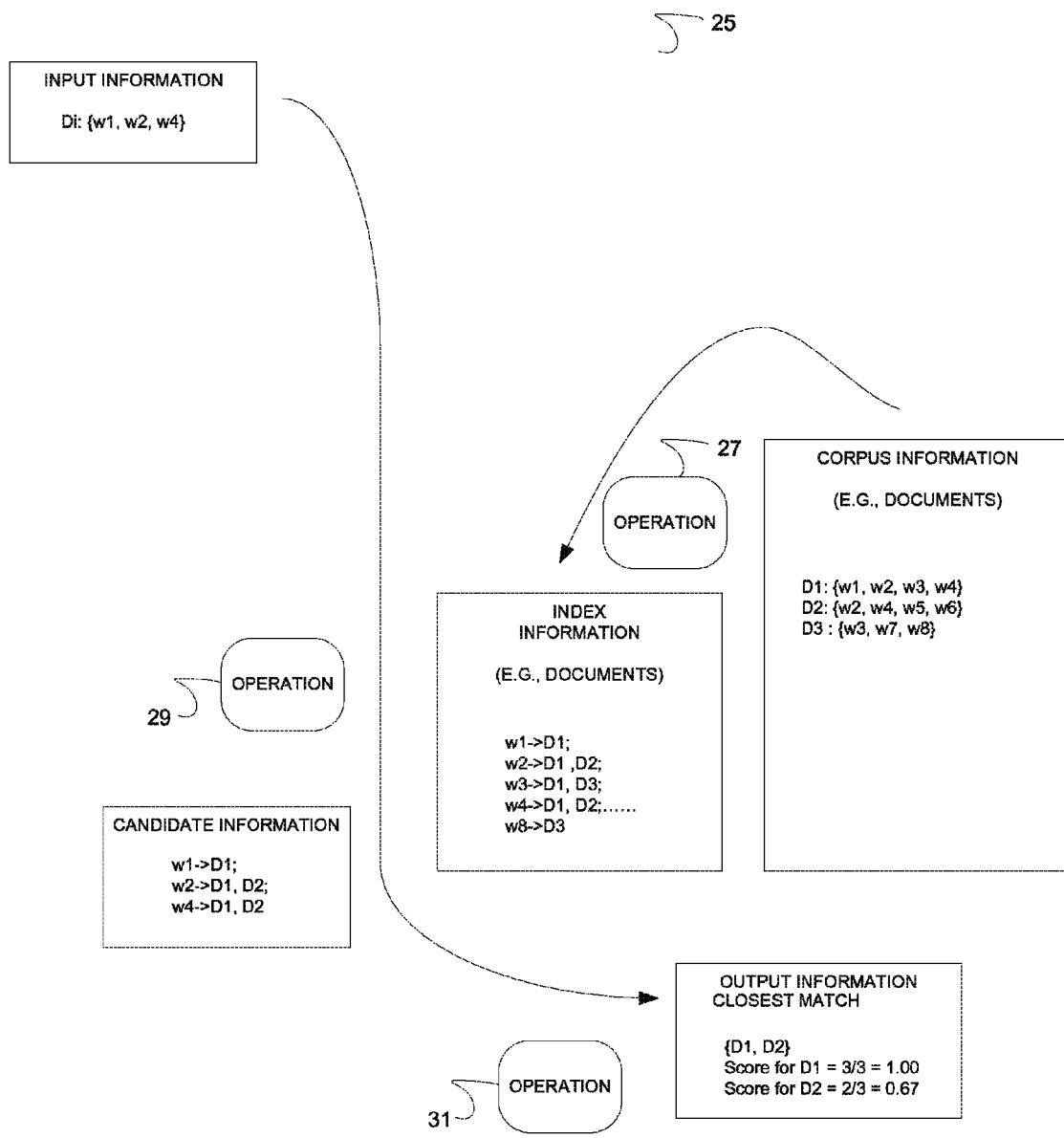
FIG. 3 is a diagram depicting a sequence of operations utilizing an index, according to one example embodiment, to execute a closest match search.

FIG. 3 is a diagram depicting a sequence of operations 25, according to one example embodiment, to execute a closest match search. The sequence of operations 25 differs from the prior two sequences of operations by utilizing an index. Utilization of an index may include the following:
1. Define a measure of similarity;
2. index the features found in the target candidates (e.g. text tokens in documents or product titles, or non textual attribute values such as dates, prices or colors);
3. search for candidates which contain the features in the input; and
4. calculate a score for each of the candidates found in step 3 using the measure defined in step 1.

For example, one approach may use tokens as features. A token is an atomic unit of text (e.g., word, punctuation, etc.). Another approach may use non textual attribute values such as dates, prices or colors as features. Indeed, a feature may be any entity, combination, or sequence of entities, associated with the target candidates. For example, a consecutive sequence of two text tokens (often known as bi-grams) can be a feature, and so can a combination of a price and a date.

A feature may be a single entity or a combination or a sequence of multiple entities. Further, features that overlap over the length of the input information may constitute a similarity measure, according to one embodiment. For example, a set of features that completely overlaps input information may constitute a similarity measure of 100%.

The sequence of operations 25 illustrates the utilization of corpus information to generate (operation 27) an index that may be subsequently utilized for a comparison (operation 29) with input information to generate candidate information that is subsequently utilized to identify (operation 31) output information. For example, the corpus information may include multiple documents (e.g., D1, D2, etc.) that respectively include tokens in the form of words (e.g., w1, w2, etc.). The index may be used to map the words to the documents that contain the words (e.g., W1–>D1). The output information includes the most closely matched document from the corpus information based on scores. The scores represent the coverage of the input information (e.g., Di) by the words in the respective document from the corpus information. For example, Di is illustrated as 100% covered by Di because Di contains all of the words in Di. The success of the sequence of operations 25 is dependent on the ability of the measure of similarity to accurately represent the actual degree of similarity, which, in turn, depends on:
1. what the features are, and
2. how the score is calculated (e.g., how the features are weighted and how the scores from all the features found are combined, common weighting methods may include inverse document frequency (IDF)).

Features that may be used to Measure Similarity

Consider the following example input information: "EOS Rebel XSi." Features that may be used to measure similarity with the example input information may include:
Unigrams ("EOS," "Rebel," "XSi,")
(Consecutive) Bi-grams ("EOS Rebel", "Rebel XSi", ... )
Non-consecutive Bi-grams ("EOS"+"Rebel", "EOS"+"XSi", ..., "Rebel"+"XSi", ... )
(Consecutive) Trigrams
Non-consecutive Trigrams
(Consecutive) N-grams
Non-consecutive N-grams In general, M-grams function better for measuring similarity than N-grams for any M>N. M-grams function better than N-grams because, for any M>N, the similarity measures using M-grams as features are less prone to score an estimation error compared to those using N-grams. Calculating the score of a candidate based on multiple feature matches may include combining the scores of the individual matches with the assumption that they are conditionally independent. Combining scores in this manner may result in the inflation of the scores of input with multiple matches of related features (e.g., the main short-coming of the Naïve Bayesian approach). For example, from a Bayesian point of view, for cameras, a match of the feature "EOS" should not provide any additional evidence if the feature "Rebel" is also found (since "Rebel" implies "EOS"). On the other hand, if the bi-gram "EOS"+"Rebel" is a feature itself, then no combination of scores from individual matches is needed, and a major source of score estimation error is avoided. Accordingly, M-grams function better for measuring similarity than N-grams for any M>N.

The Reason N-grams are not Used

In prior art systems, uni-grams and, at most, bi-grams may be used as features due to the issue of scalability. For example, N-grams that are greater than two may not be used because a vocabulary of X distinct words scales as follows:
Number of possible unigrams=X
Number of possible bi-grams=$X^2$
Number of possible tri-grams=$X^3$ Number of possible n-grams=$X^n$ In other words, the size of an index increases exponentially as N increases. Accordingly, using N-grams that are greater than two may result in memory requirements that are prohibitively large and access delays that are prohibitively long.

The Maximal Signature Match Approach

This disclosure describes solutions for the above described closest match search problems. A closest match search may include a given corpus and, for each input, find members in the corpus which most closely resemble the input. Merely for example, in one embodiment, a listing may be received from a seller for publication on a network-based marketplace. The listing may include input in the form of a title that is descriptive of an item that is for sale (lease, bid, donation, etc.) on the network-based marketplace. In this embodiment, the corpus may take the form of a product catalog that includes members that correspond to products. To match the title in the listing to a product in the catalog of products, an index may be generated. The index may store "signatures" for each of the products. Once generated, the signatures may be utilized to quickly and efficient identify the product that most closely matches the title of the listing because the index is generated such that each of the "signatures" in the product catalog corresponds to a single product. Accordingly, the "signatures" are designated as such because they signify a single product in the catalog of products. Utilizing "signatures" enables the method and systems that are described herein to achieve a high degree of accuracy and reduce runtime resources.

The Maximal Signature Match Approach is described in various embodiments more fully in detail as follows. The Maximal Signature Match Approach may utilize N-grams as features, with N=up to the number of entities in the input. For example, the entities may include tokens in the text (e.g., input). For the model value "EOS Rebel XSi," the candidate features may be:

"EOS"+"Rebel"+"XSi"
"EOS"+"Rebel"
"EOS"+"XSi"
"Rebel"+"XSi"
"EOS"
"Rebel"
"XSi"

and, for the title "Canon EOS Rebel XSi," the candidate features may be:

"Canon"+"EOS"+"Rebel"+"XSi"
"Canon"+"EOS"+"Rebel"
"Canon"+"EOS"+"XSi"
"Canon"+"Rebel"+"XSi"
"EOS"+"Rebel"+"XSi"
"Canon"+"EOS"
"Canon"+"Rebel"
"Canon"+"XSi"
"EOS"+"Rebel"
"EOS"+"XSi"
"Rebel"+"XSi"
"Canon"
"EOS"
"Rebel"
"XSi"

The Maximal Signature Match Approach may utilize N-grams as features because this approach only utilizes index "signatures" thereby precluding the prohibitively large memory requirements previously mentioned. Further, only signatures with scores above a certain threshold may be indexed. Specifically, a "signature" is defined as an n-gram which uniquely identifies a target (e.g., title, attribute value, etc.). For example, a camera catalog with only two Canon EOS cameras may include the following entries:

12345678, "Canon EOS Rebel XSi 12.2 Megapixel," Brand=Canon, Model=EOS Rebel XSi, Resolution=12.2 Megapixel 12345679, "Canon EOS Digital Rebel XTi 10.1 Megapixel," Brand=Canon, Model=EOS Digital Rebel XTi, Resolution=10.1 Megapixel The signatures for "model=EOS Rebel XSi" may be:
EOS+Rebel+XSi
Rebel+XSi
EOS+XSi
XSi Note that EOS+Rebel, EOS, or Rebel, are not signatures.

The Maximal Signature Match Approach—Scoring and Weighting

A score may be calculated for each signature, based on the signature "coverage" of the target and the weights of the entities in the signature. Weights may be determined based on occurrence frequency. For example, assume the weights of EOS, Rebel and XSi are 0.7, 0.7 and 0.9, respectively. Then the scores of the signatures may be computed as follows:

Weight(EOS+Rebel+XSi)=(0.7+0.7+0.9)/(0.7+0.7+0.9)=1.0

Weight(Rebel+XSi)=(0.7+0.9)/(0.7+0.7+0.9)=0.7

Weight(EOS+XSi)=(0.7+0.9)/(0.7+0.7+0.9)=0.7

Weight(XSi)=(0.9)/(0.7+0.7+0.9)=0.39

If the targets are titles, the weight of a token may be determined based on the type of attribute in which it is found, in addition to occurrence frequencies. For example, a token found in a model attribute may be given a higher weight than a token that is fount in a brand attribute. Further, both tokens may be assigned a higher weight than a token not found in either of these features.

The Maximal Signature Match Approach—Threshold Optimization

If a threshold of 0.6 is applied to the scores for the above listed signatures (e.g., 1.0, 0.7, 0.7, and 0.39), then the signatures to index include the following:

EOS+Rebel+XSi (w=1.0)
Rebel+XSi (w=0.7)
EOS+XSi (w=0.7)

For run time optimization, the set of entities which form the signatures may be further indexed with identifiers. For example, the indices may appear as follows:

EOS+Rebel+XSi->[12345678, 1.0]
Rebel+XSi->[12345678, 0.7]
EOS+XSi->[12345678, 0.7]
. . .
and
EOS
Rebel
XSi

The Maximal Signature Match Approach—Maximal Signature Match Summary

Figure 4:
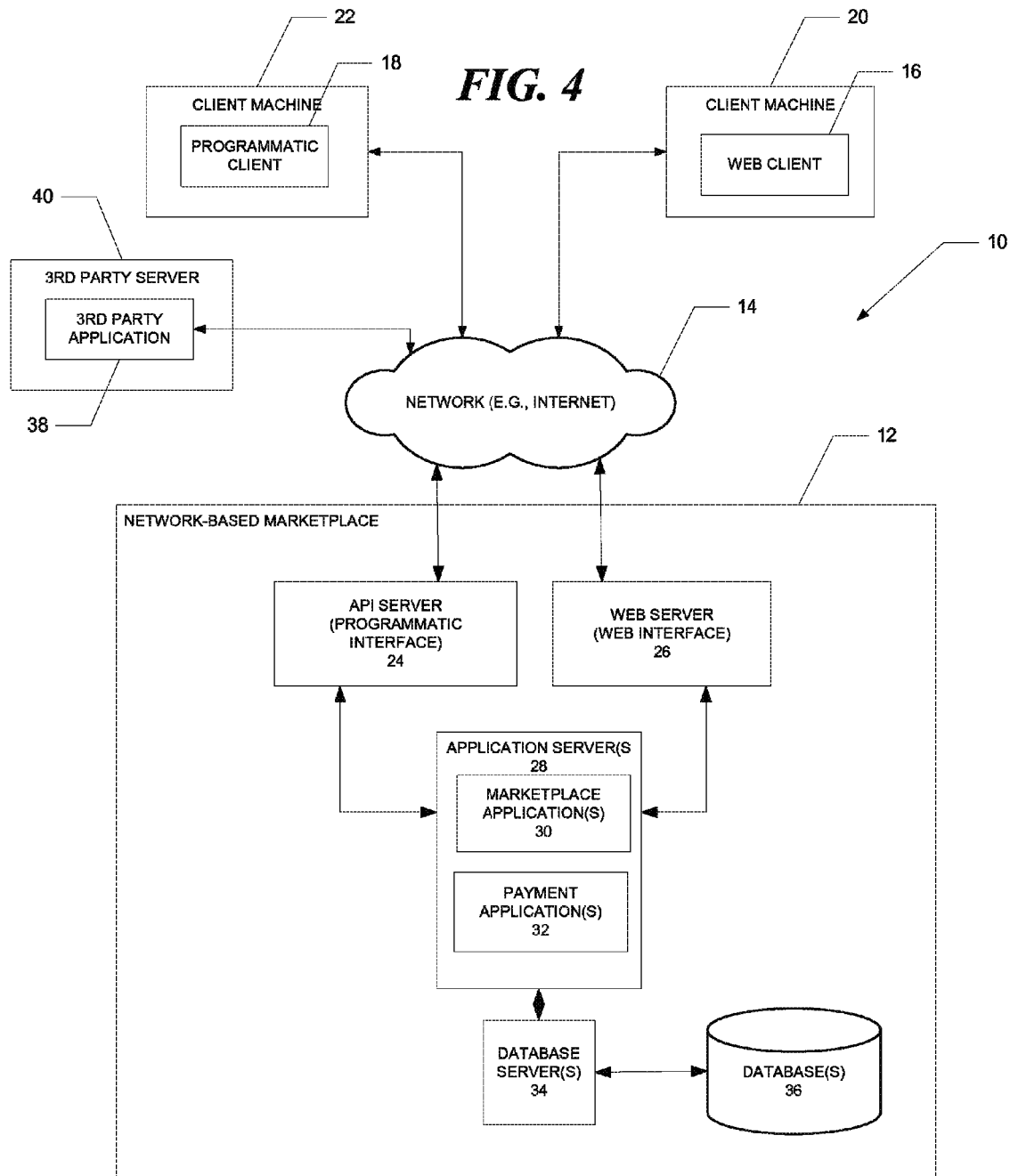
FIG. 4 is a network diagram depicting a system, according to one example embodiment, to execute a closest match search.

At run-time, given a listing, a system, for which an embodiment is shown in FIG. 4 and described below, may identify the longest signatures that may be found in the listing. For example, suppose the system is to identify the model of an input listing for a camera by using the title of the listing as input, and the title of the listing is:

"New Canon Digital Rebel XSi, Great Deal!"

Using the token index, the system may extract the set of tokens that are found in any of the signatures:

"Rebel," "XSi"

The system may then create all possible signatures from this set, starting from the whole set and continuing with the next biggest subset until all possible signatures are identified. The system may then determine whether any of the respective signatures are found in the signature index. For our example, the set of all possible signatures includes the signature "Rebel"+"XSi." The signature "Rebel"+"XSi" is the longest signature and also identified in the signature index. Accordingly, the system is done in the first lookup, with the result= [1234567, 0.7].

Platform Architecture

FIG. 4 is a network diagram depicting a system 10, according to one exemplary embodiment of the present disclosure, having a client-server and a peer-to-peer architecture. A social networking system facilitates shopping activity, in the exemplary form of a network-based marketplace 12 communicating over a network 14. The network-based marketplace 12 communicates in a client-server architecture with clients. The network-based marketplace 12 provides server-side functionality, via the network 14 (e.g., the Internet) to one or more client machines 20 and 22. FIG. 4 illustrates, for example, a web client 16 (e.g., a browser, such as the Internet Explorer browser developed by Microsoft Corporation of Redmond, Washington State), and a programmatic client 18 executing on respective client machines 20 and 22.

Turning to the network-based marketplace 12, an application program interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the network-based marketplace 12. The payment applications 32 likewise provide a number of payment services and functions to users. For example, the payment applications 30 may allow users to quantify for, and accumulate, value (e.g., in a commercial currency, such as the U.S. dollar, or a proprietary currency, such as "points") in accounts, and then to later redeem the accumulated value for products (e.g., goods or services) that are made available via the marketplace applications 30. While the marketplace and payment applications 30 and 32 are shown in FIG. 4 to both form part of the network-based marketplace 12, it will be appreciated that, in alternative embodiments of the present disclosure, the payment applications 32 may form part of a payment service that is separate and distinct from the network-based marketplace 12. The network-based marketplace 12 may be embodied as Ebay, The Worlds Online Marketplace®, provided by Ebay, Inc. of San Jose, Calif.

Further, while the system 10 shown in FIG. 4 employs a client-server architecture and a peer-to-peer architecture, the present disclosure is, of course, not limited to such an architecture and could equally well find application in any combination of client-server, distributed, or peer-to-peer architecture systems. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may be, for example, a seller application (e.g., the TurboLister application developed by Ebay Inc., of San Jose, Calif.) to enable sellers to author and manage listings (e.g., items) on the network-based marketplace 12 in an off-line manner, and to perform batch-mode communications between the programmatic client 18 and the network-based marketplace 12.

FIG. 4 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Applications

Figure 5:
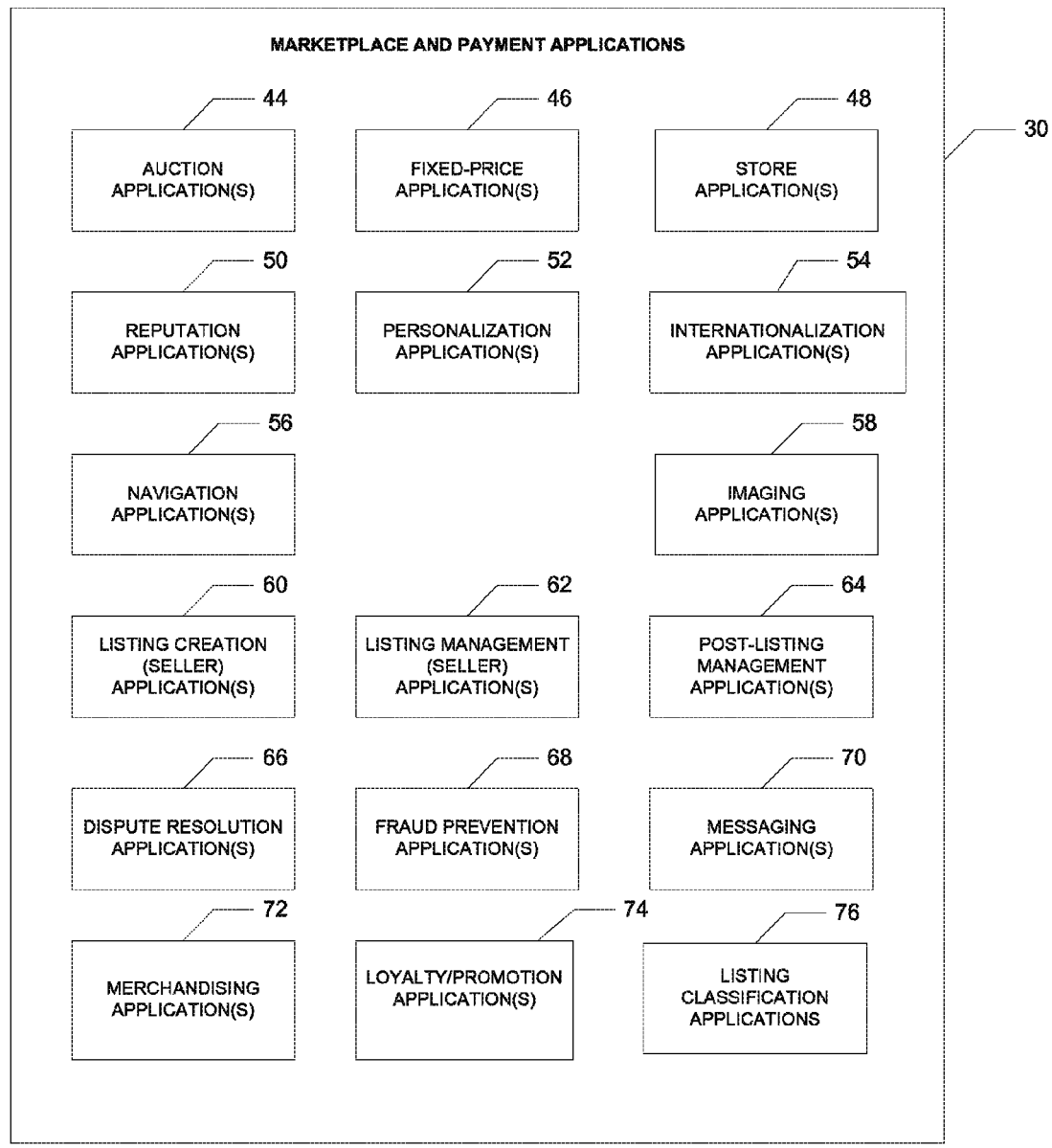
FIG. 5 is a block diagram illustrating marketplace and payment applications, according to an embodiment.

FIG. 5 is a block diagram illustrating multiple marketplace and payment applications 30 that, in one exemplary embodiment of the present disclosure, are provided as part of the network-based marketplace 12. The network-based marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions, etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by Ebay Inc., of San Jose, Calif.) may be offered in conjunction with an auction-format listing, and may allow a buyer to purchase goods or services which are also being offered for sale via an auction for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the network-based marketplace 12 to personalize various aspects of their interactions with the network-based marketplace 12. For example a user may, utilizing an appropriate personalization application 52, create a personalized reference page on which information regarding transactions to which the user is (or has been) a party may be viewed. Further, a personalization application 52 may enable a user to personalize listings and other aspects of their interactions with the network-based marketplace 12 and other parties.

Internationalization applications 54 may support a number of marketplaces that are customized, for example, for specific geographic regions. A version of the network-based marketplace 12 may be customized for the United Kingdom, whereas another version of the network-based marketplace 12 may be customized for the United States. Each of these versions may operate as an independent marketplace, or may be customized (or internationalized) presentations of a common underlying marketplace.

Navigation of the network-based marketplace 12 may be facilitated by one or more navigation applications 56. For example, a search application enables key word searches of listings published via the network-based marketplace 12. A browse application allows users to browse various category, catalogue, or inventory data structures according to which listings may be classified within the network-based marketplace 12. Various other navigation applications may be provided to supplement the search and browsing applications.

In order to make listings, available via the network-based marketplace 12, as visually informing and attractive as possible, the marketplace applications 30 may include one or more imaging applications 58 which users may utilize to upload images for inclusion within listings. The imaging applications 58 also operate to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers to conveniently author listings pertaining to goods or services that they wish to transact via the network-based marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings.

One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller to conveniently provide feedback regarding multiple buyers to the reputation applications 50. In addition, the post-listing management applications 64 may facilitate the tracking and organization of listings for a user by maintaining lists of select listings. For example, the lists may include watch information, won information, lost information, selling information, sold information and unsold information.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, with such messages, for example, advising users regarding the status of listings at the network-based marketplace 12 (e.g., providing "outbid" notices to bidders during an auction process or providing promotional and merchandising information to users).

Merchandising applications 72 support various merchandising functions that are made available to sellers to enable sellers to increase sales via the network-based marketplace 12. The merchandising applications 72 also operate the various merchandising features that may be invoked by sellers, and may monitor and track the success of merchandising strategies employed by sellers.

The network-based marketplace 12 itself, or one or more parties that transact via the network-based marketplace 12, may operate loyalty programs that are supported by one or more loyalty/promotional applications 74. For example, a buyer may earn loyalty or promotional points for each transaction established and/or concluded with a particular seller, and may be offered a reward for which accumulated loyalty points can be redeemed.

Listing classification applications 76 may support the classification of listings. For example, the listing classification applications 76 may be utilized to generate an index that stores "signatures" that correspond to products. Once generated, according to one embodiment, the "signatures" in the index may be utilized to quickly and efficient identify a product from a catalogue that most closely matches a particular listing and to classify the listing according to the identified product.

Figure 6A:
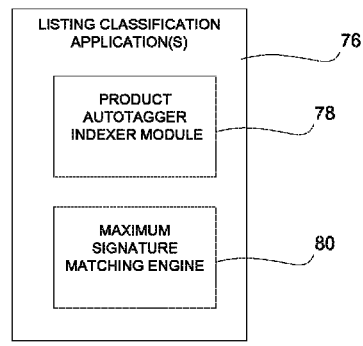
FIG. 6A is a block diagram illustrating listing classification applications, according to an embodiment.

FIG. 6A is a block diagram illustrating listing classification applications 76. The listing classification applications 76 may include a product autotagger indexer module 78 and a maximum signature matching engine 80. The product autotagger indexer module 78 may be used to generate an index. The index may be used to store signatures and other information that are respectively associated with products. The maximum signature matching engine 80 may utilize the index and the signatures in the index to identify a listing as being most closely matched to a particular product based on signatures in the listing that are matched to signatures in the index.

Figure 6B:
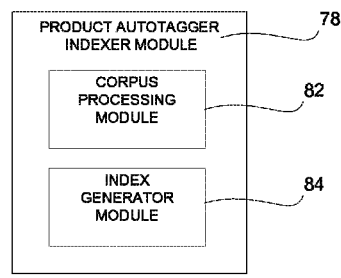
FIG. 6B is a block diagram illustrating a product autotagger indexer module, according to an embodiment.

FIG. 6B is a block diagram illustrating a product autotagger indexer module 78. The product autotagger indexer module 78 may include a corpus processing module 82 and an index generator module 84. The corpus processing module 82 may be used to process the corpus information and the index generator module 84 may be used to generate an index.

Figure 6C:
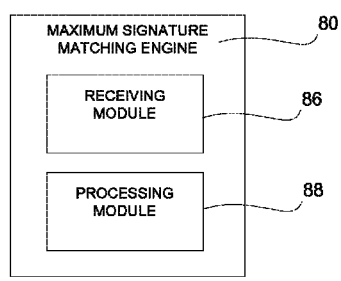
FIG. 6C is a block diagram illustrating a maximum signature matching engine, according to an embodiment.

FIG. 6C is a block diagram illustrating a maximum signature matching engine 80. The maximum signature matching engine 80 may include a receiving module 86 and a processing module 88. The receiving module 86 may receive input information and identify input features in the input information. For example, the input information may include listing information for a listing that is used to offer an item for sale or auction on the network-based marketplace 12. The processing module 88 may identify features in the input information, generate input signatures based on the features, and identify members in corpus information that most closely match the input signatures by utilizing an index.

Data Structures

Figure 7A:
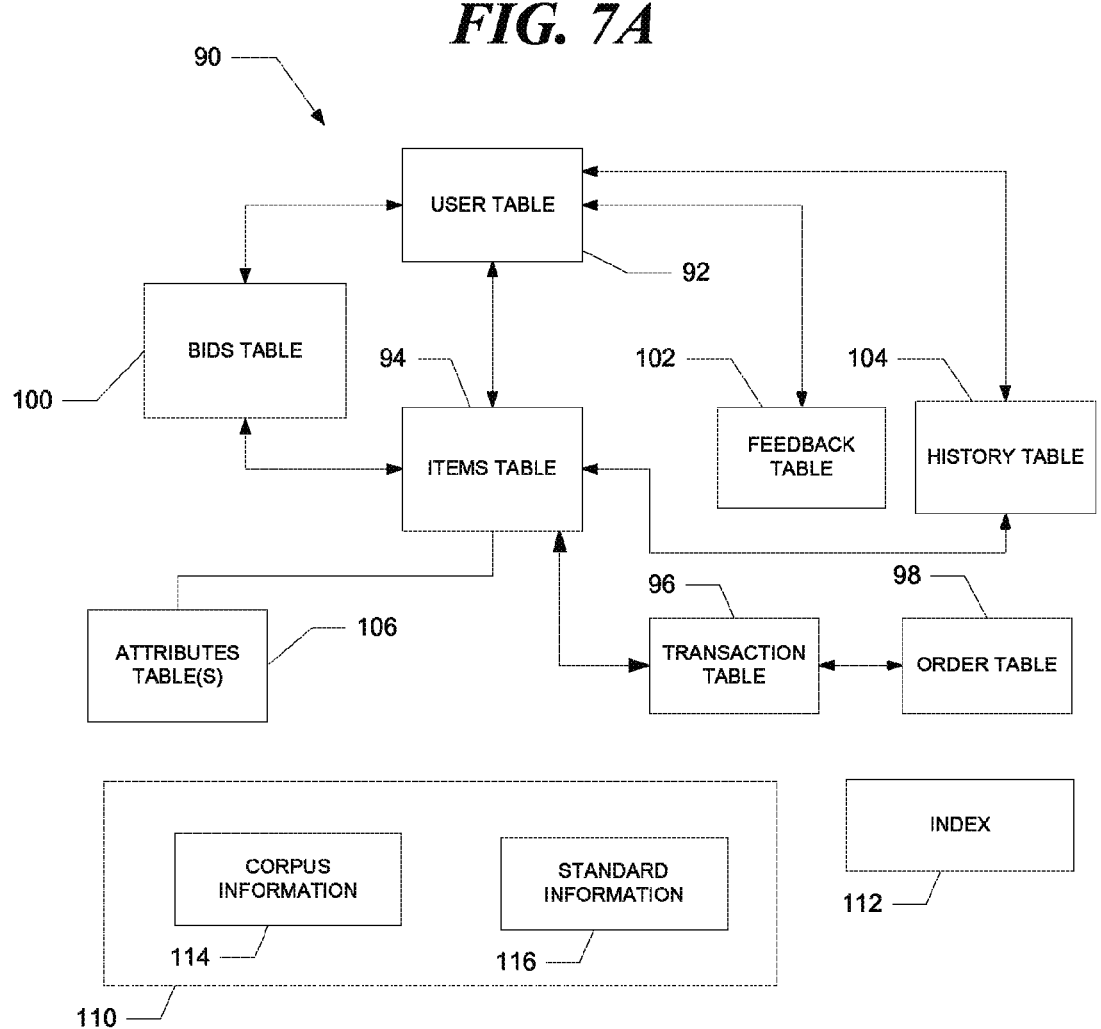
FIG. 7A is a block diagram illustrating tables, according to an embodiment.

FIG. 7A is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifiers, address information, financial information, and account information pertaining to each such registered user. A user may, it will be appreciated, operate as a seller, a buyer, or both, within the network-based marketplace 12. In one example embodiment of the present disclosure, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for listings of goods and services that are available to be, or have been, transacted via the network-based marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, with each order record being associated with an order. Each order, in turn, may be with associated to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one example embodiment, to construct and maintain reputation information concerning users. In one embodiment, the reputation information may include feedback records associated with transactions. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, with the currency attribute identifying the currency of a price for the relevant item as specified by a seller.

The tables 90 are further shown to include index generation information 110 and an index 112. The index generation information 110 may include corpus information 114 and standard information 116. For example, the corpus information 114 and the standard information 116 may include information for a product catalog that includes multiple products that may be offered for sale or auction on the network-based marketplace 12. The index 112 may be used to process input information to efficiently identify the most closely matching members in the corpus information 114. It will be appreciated that other embodiments may include multiple entries of index generation information 110 corresponding to different types of products, documents, categories, and so forth.

Figure 7B:
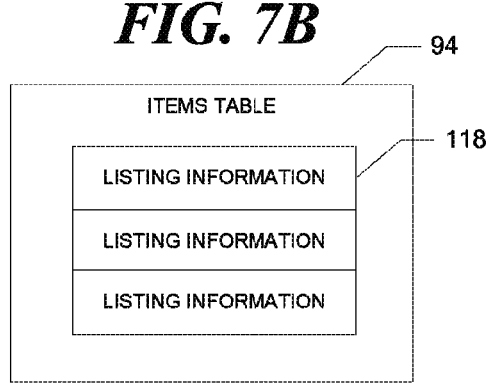
FIG. 7B is a block diagram illustrating an items table, according to an embodiment.

FIG. 7B is a block diagram illustrating an items table 94, according to an embodiment. The items table 94 may include multiple entries of listing information 118. Each entry may correspond to a listing of an item or service that is offered for sale on the network-based marketplace 12.

Figure 7C:
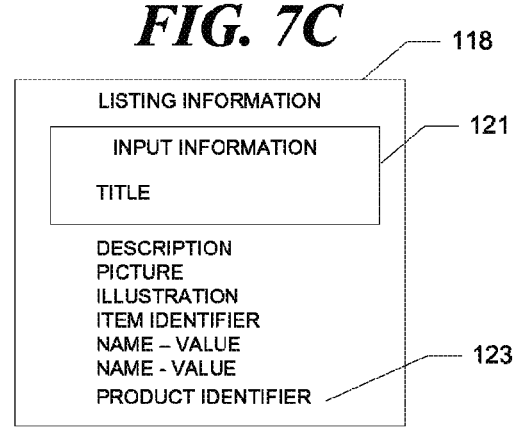
FIG. 7C is a block diagram illustrating listing information, according to an embodiment.

FIG. 7C is a block diagram illustrating listing information 118, according to an embodiment. The listing information 118 may include input information 121 and a product identifier 123. The input information 121 may be communicated to a maximum signature matching engine 80 that identifies the most closely matched product in a product catalog based on the input information 121, and may store a product identifier 123 that corresponds to the product in the listing information 118. The input information 121 is shown to include a title that may include alphanumeric text, a description that may include alphanumeric text, a picture, an illustration, an item identifier that uniquely identifies the listing from other listings in the items table 94 and, optionally, one or more name-value pairs. For example, a name value-pair may include PRICE=5.00, COLOR=blue, or other name-value pairs. It will be appreciated that other embodiments may include other input information 121.

Figure 8A:
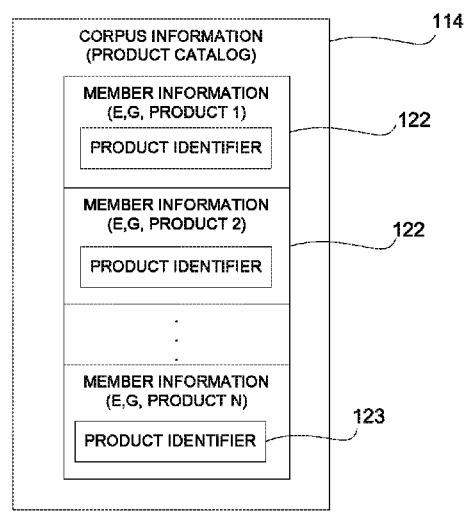
FIG. 8A is a block diagram illustrating corpus information, according to an embodiment.

FIG. 8A is a block diagram illustrating corpus information 114, according to an embodiment. The corpus information 114 may be embodied as a product catalogue. Other embodiments may include a set of documents, a catalog of places, a catalog of services, and so forth. The corpus information 114 may include multiple entries of member information 122 that, in the present embodiment, correspond to different products. Each entry of the member information 122 may include a product identifier 123 that identifies one product from another product in the corpus information 114, as well as text that describes the product, numeric information such as a price of the product or specifications of the product, pictures of the product, illustrations of the product, or any other information that may be descriptive of the product.

Figure 8B:
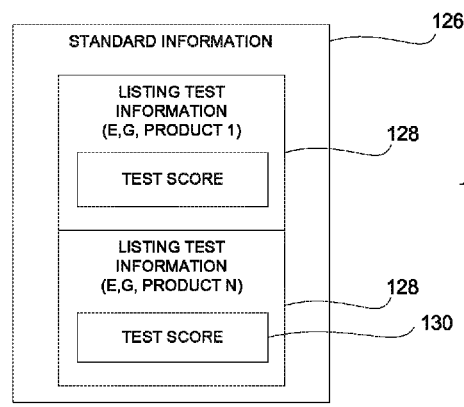
FIG. 8B is a block diagram illustrating standard information, according to an embodiment.

FIG. 8B is a block diagram illustrating standard information 126, according to an embodiment. The standard information 126 may include listing test information 128. Each entry of listing test information 128 may include information that is descriptive of an item or service that may be offered for sale on the network-based marketplace 12 as well as a test score 130. The test score 130 may be utilized to evaluate the precision of the maximum signature matching engine 80. For example, the maximum signature matching engine 80 may receive and process an entry of the listing test information 128 to generate a score for comparison with the corresponding test score 130.

Figure 9A:
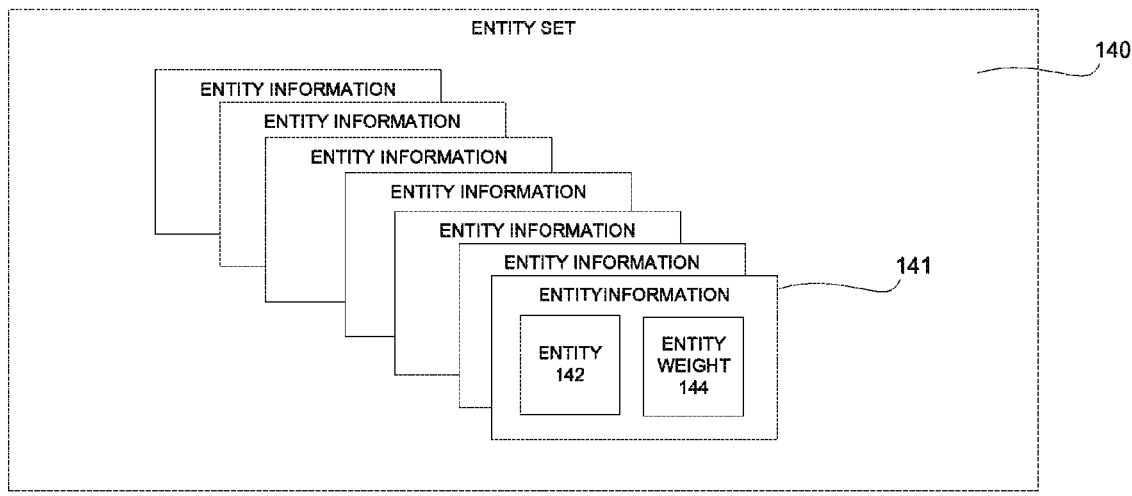
FIG. 9A is a block diagram illustrating a entity set, according to an embodiment.

FIG. 9A is a block diagram illustrating an entity set 140, according to an embodiment. An entity set 140 may be generated for each member in the corpus information 114. The entity set 140 may include one or more entries of entity information 141. The entity set 140 may be generated by scanning member information 122 in the corpus information 114, identifying entities 142 in the particular member, and assigning entity weights 144 to the respective entities 142 (e.g., tokens, phrases of words, pictures, URLS, etc). For example, the entity 142 may be embodied as a word or acronym that has been parsed from the member information 122. Further, for example, the entity weight 144 for the entity 142 may be determined based on an occurrence frequency of the entity 142 in the member information 122. Other embodiments may utilize other methods to compute the entity weight 144.

Figure 9B:
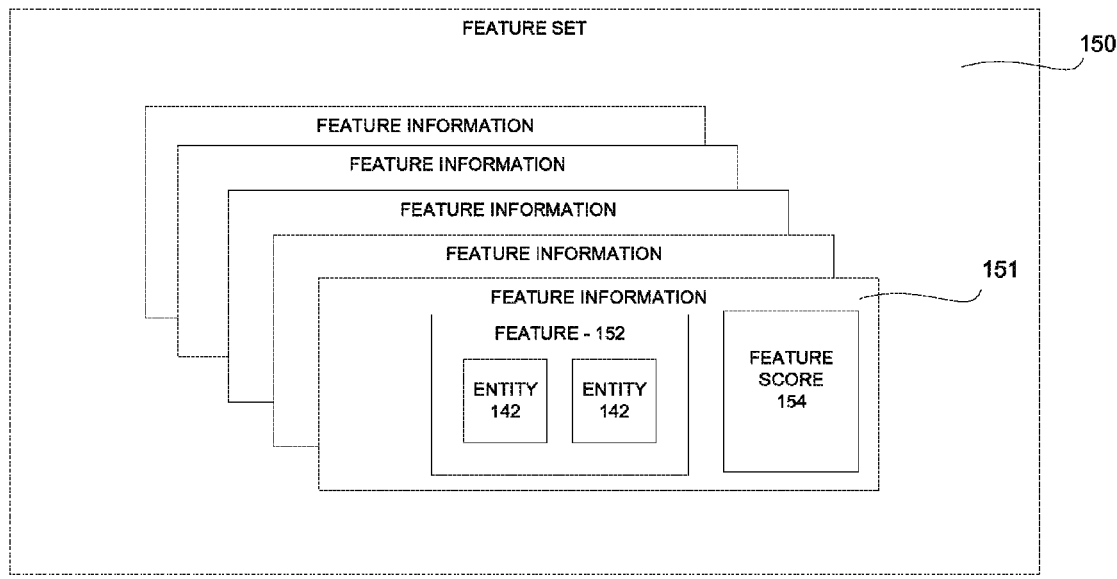
FIG. 9B is a block diagram illustrating a feature set, according to an embodiment.

FIG. 9B is a block diagram illustrating a feature set 150, according to an embodiment. A feature set 150 may be generated for each member in the corpus information 114. The feature set 150 may include one or more entries of feature information 151. The feature information 151 may be generated by forming possible combinations of entities 142 taken from a particular entity set 140, as described above. The feature information 151 may include a feature 152 and a feature score 154 that corresponds to the particular feature 152. The feature 152 may include one or more entities 142 notwithstanding two entities 142 being illustrated in the feature 152 in FIG. 9B. The feature score 154 may be determined by summing the entity weights 144 that correspond to the entities 142 in the feature 152. In some embodiments, feature information 151 associated with a feature score 154 that is less than a predetermined threshold may be removed from the feature set 150.

Figure 9C:
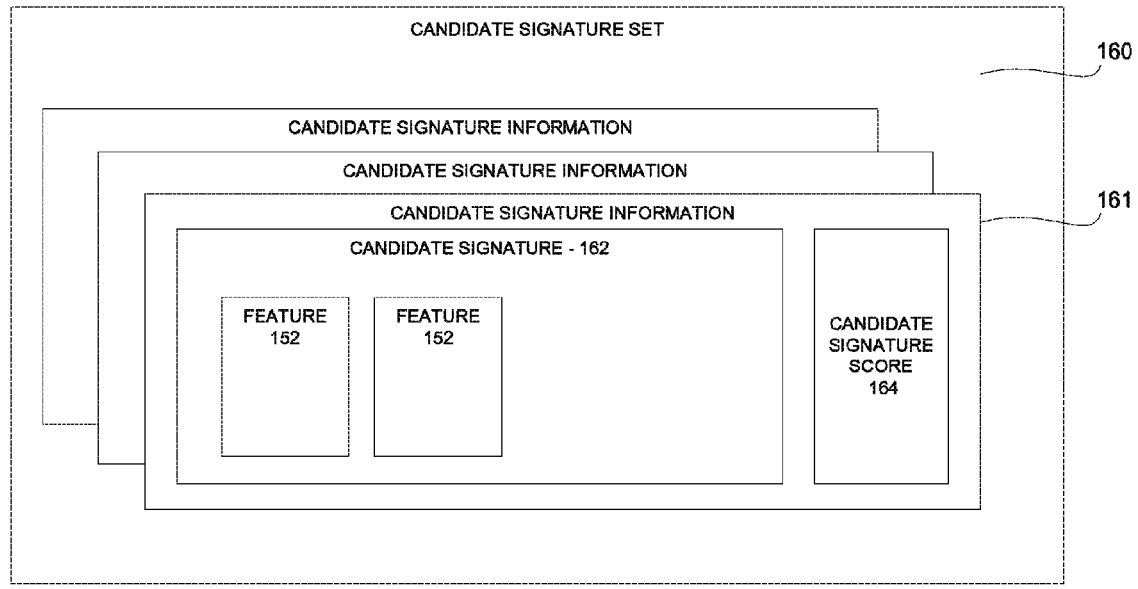
FIG. 9C is a block diagram illustrating a candidate signature set, according to an embodiment.

FIG. 9C is a block diagram illustrating a candidate signature set 160), according to an embodiment. The candidate signature set 160 may include one or more entries of candidate signature information 161. A candidate signature set 160 may be generated for each member in the corpus information 114. The candidate signature set 160 may be generated by forming all possible N-grams from the features 152 of a particular feature set 150. The candidate signature information 161 may include a candidate signature 162 and a candidate signature score 164 that corresponds to the candidate signature 162. The candidate signature 162 may include one or more features 152, notwithstanding two features 152 being illustrated in the candidate signature 162 in FIG. 9C. The candidate signature score 164 may be determined by summing the features scores 154 that correspond to the features 152 and by dividing the sum of the feature scores 154 by a value that represents the sum of the features that completely cover the particular member information 122 that corresponds to the feature set 150. In some embodiments, candidate signature information 161 associated with a candidate signature score 164 that is less than a predetermined threshold may be removed from the candidate signature set 160.

Figure 9D:
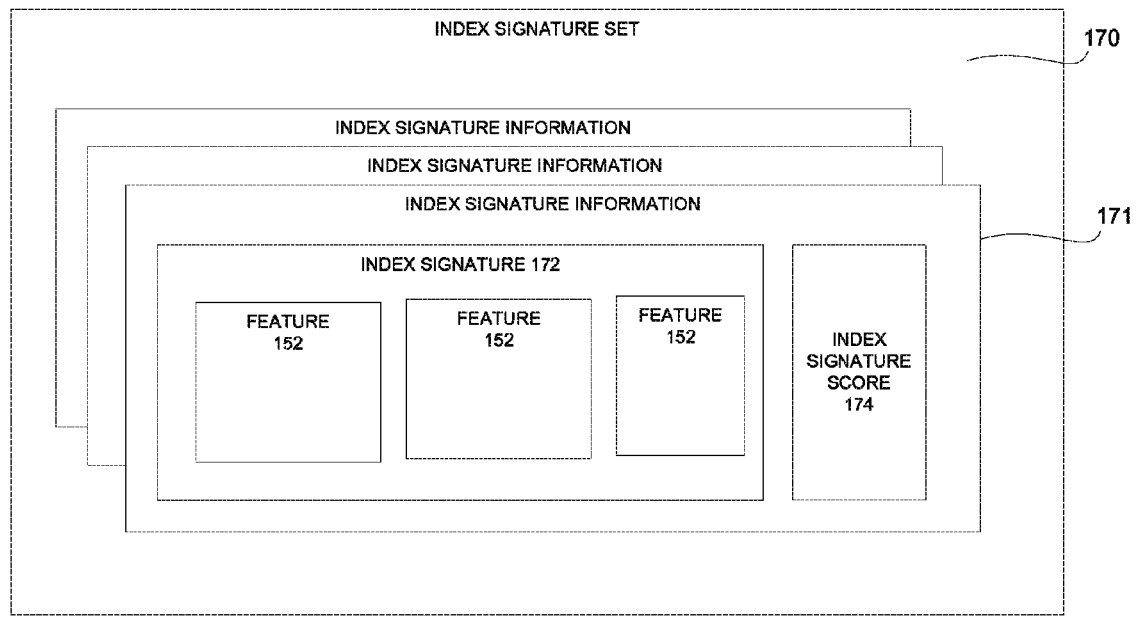
FIG. 9D is a block diagram illustrating an index signature set, according to an embodiment.

FIG. 9D is a block diagram illustrating an index signature set 170, according to an embodiment. The index signature set 170 may include one or more entries of index signature information 171. An index signature set 170 may be generated for each member in the corpus information 114. The index signature set 170 may be generated by identifying the candidate signatures 162 in the candidate signature set 160 for a particular member (e.g., Product 1) that does not appear in the candidate signature sets 161 respectively associated with the other members (e.g., Products 2-N) in the corpus information 114. Accordingly, the index signature set 170 includes index signature signatures 172 that are unique to the particular member and not found in the other members in the corpus information 114. The index signature information 171 may include an index signature 172 and an index signature score 174 that corresponds to the index signature 172. The index signature 172 may include one or more features 152, notwithstanding the three features 152 being illustrated in the index signature 172 in FIG. 9D. The index signature score 174 may be determined by summing the features scores 154 that correspond to the three features 152 and by dividing the sum of the feature scores by a value that represents the sum of the features that completely cover the particular member information 122 that corresponds to the feature set 150.

Figure 10A:
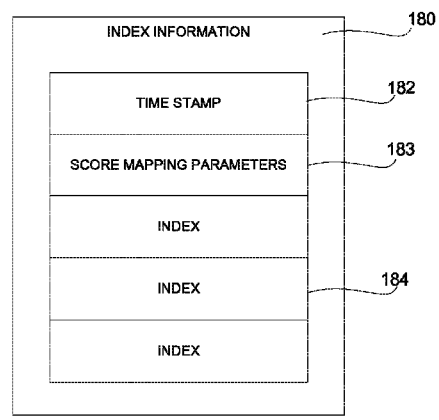
FIG. 10A is a block diagram illustrating index information, according to an embodiment.

FIG. 10A is a block diagram illustrating index information 180, according to an embodiment. The index information 180 may be generated by the product autotagger indexer module 78. The index information 180 may include a time stamp 182, score mapping parameters 183, and one or more indexes 184. The time stamp 182 may record the time the index information 180 was generated. The score mapping parameters 183 may be generated and stored with the generation of the index (s) 184. For example, the product autotagger indexer module 78 may generate an index 184 based on corpus information 114 and invoke the maximum signature matching engine 80 to process the listing test information 128 included in the standard information 126 that corresponds to the corpus information 114. The results (e.g., a product identifier 123 and a confidence score for each listing test information 128) returned by the maximum signature matching engine 80 may be compared to the test scores 130 provided in the standard information 126 and evaluated to generate a sequence of 2-tuples of confidence-score-threshold and precision-percentage. This sequence of 2-tuples may be used to generate a mapping from the confidence score to an estimated precision percentage as a $3^{rd}$ degree polynomial, using the "least-squares fit" method, according to an embodiment. The resulting score mapping parameters 183 may be stored in the index 184. The indexes 184 may be respectively generated for each pair of corpus information 114 and standard information 126.

Figure 10B:
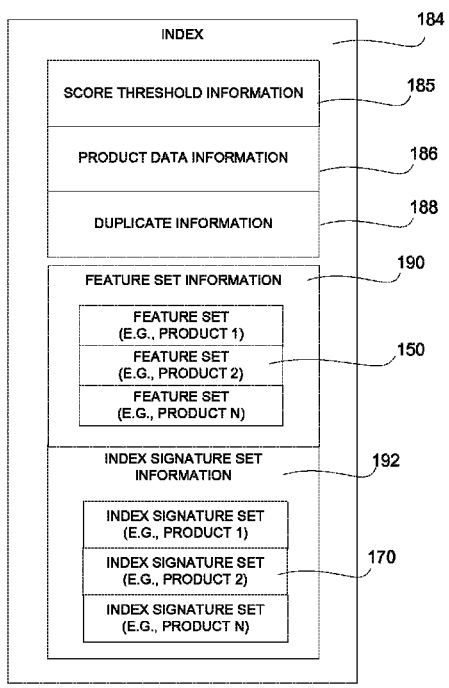
FIG. 10B is a block diagram illustrating an index, according to an embodiment.

FIG. 10B is a block diagram illustrating an index 184, according to an embodiment. The index 184 may be generated by the product autotagger indexer module 78 based on corpus information 114. The index 184 may include score threshold information 185, product data information 186, duplicate information 188, feature set information 190, and index signature set information 192. The score threshold information 185 may be a predetermined threshold below which a signature is discarded.

The product data information 186 may include a product identifier 123 and price for each member information 122 (e.g., product) in the corpus information 114. The duplicate information 188 may include a mapping of member information 122 (e.g., products) with the same titles. The feature set information 190 may include the features sets 150 respectively corresponding to member information 120 (e.g., products), as previously described in FIG. 9B. The index signature set information 192 may include index signature sets 170 respectively corresponding to the member information 122 (e.g., products), as previously described in FIG. 9D.

Figure 11A:
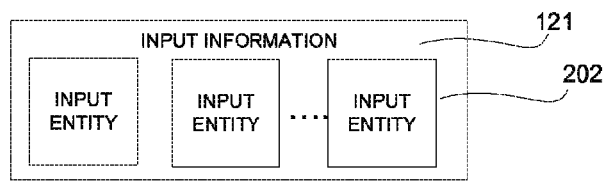
FIG. 11A is a block diagram illustrating input information, according to an embodiment.

FIG. 11A is a block diagram illustrating input information 121, according to an embodiment. The input information 121 may have been extracted from listing information 118. For example, input information 121 may include a title. In another embodiment, the input information 121 may include one or more name-value pairs. The input information 121 may include input entities 202 (e.g., tokens, phrases of words, URLs, pictures, etc.).

Figure 11B:
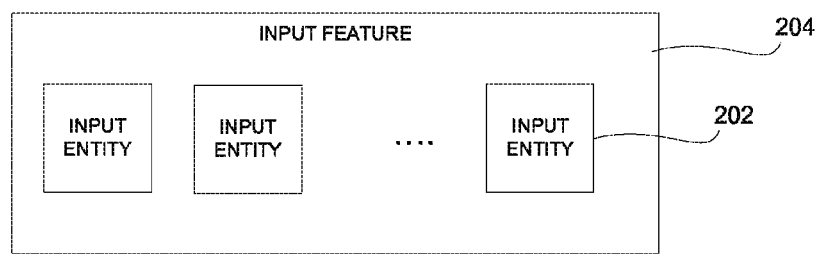
FIG. 11B is a block diagram illustrating an input feature, according to an embodiment.

FIG. 11B is a block diagram illustrating an input feature 204, according to an embodiment. The input feature 204 may include one or more input entities 202. The example illustrates three input entities 202; however, more or fewer input entities 202 may be included in a particular input feature 204.

Figure 11C:
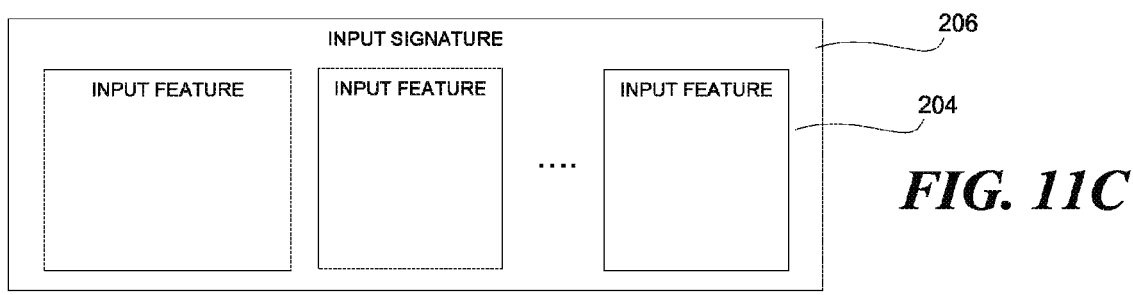
FIG. 11C is a block diagram illustrating an input signature, according to an embodiment.

FIG. 11C is a block diagram illustrating an input signature 206, according to an embodiment. The input signature 206 may include one or more input features 204. The example illustrates three input features 204; however, more or fewer input features 204 may be included in a particular input signature 206.

Figure 12:
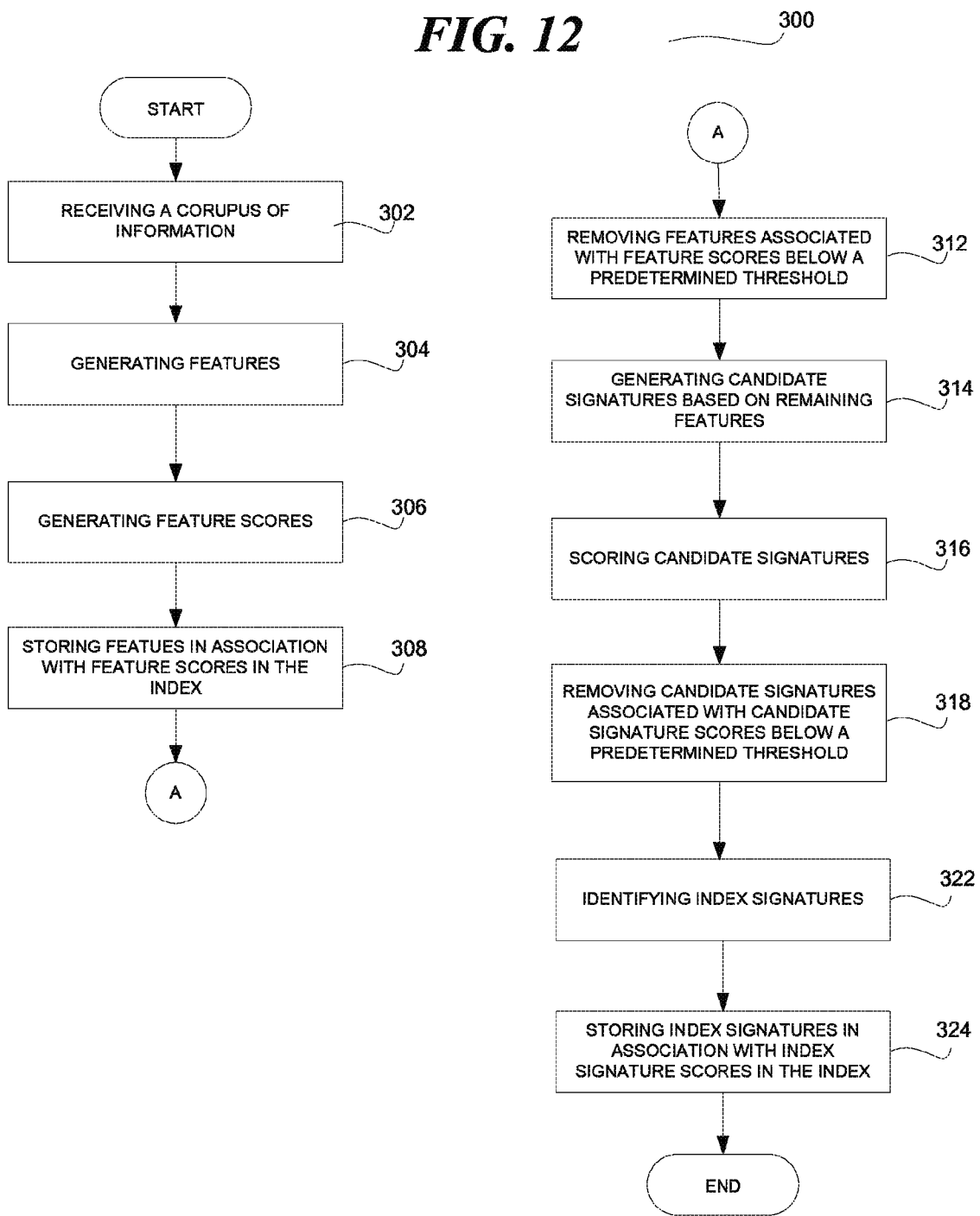
FIG. 12 is a block diagram illustrating a method, according to an embodiment, to generate an index for a closest match search.

FIG. 12 is a block diagram illustrating method 300, according to an embodiment, to generate an index 184 (not shown)

for a closest match search. The method 300 commences at operation 302 with the corpus processing module 82 receiving or accessing the corpus information 114 and the standard information 116. For example, the corpus information 114 and the standard information 116 may be for a catalog of products that are offered for sale on the network-based marketplace 12. The corpus processing module 82 may parse the respective member information 122 (e.g., product) in the corpus information 114. In one embodiment, the corpus processing module 82 may identify products with the same title and store the product identifiers 123 of such products in the duplicate information 188 in the index 184. Further, the corpus processing module 82 may extract the price from the member information 122 for each product and store the price with the corresponding product identifier 123 in the product data information 186 in the index 184.

At operation 304, the corpus processing module 82 may generate features 102. The corpus processing module 82 may generate features 102 by identifying an entity set 140 for each of the respective member information 120 that, in turn, is used to generate a feature set 150 for each of the respective member information 120. For example, the corpus processing module 82 may identify and tokenize a title respectively included in each of the member information 122. Other embodiments may identify entities 142 in other identified components of the member information 122. For example, the corpus processing module 82 may identify a set of name-value pairs included in each of the member information 120. The corpus processing module 82 may further identify the entity set 140 by filtering "stop words" from the entities 142. For example, "stop words" may include words without distinctive value such as "the," "or," etc. The corpus processing module 82 may further identify the entity set 140 by normalizing the entities 142. For example, the corpus processing module 82 may select a single entity 142 to represent other entities 142 that are identified as semantically equivalent. The corpus processing module 82 may further identify the entity set 140 by removing the entities 142 that were extracted from the title (e.g., tokens) that match the entities 142 extracted from name-value pairs. The corpus processing module 82 may utilize the entity set 140 to generate the feature set 150, as previously described. The feature set 150 may include entries of feature information 151 that are generated by forming every possible combination of entities 142 in a particular entity set 140.

At operation 306, the corpus processing module 82 may generate feature scores 154 for each of the features 152, as previously described. At operation 308, the corpus processing module 82 may store the features 152 and the respective feature scores 154 as feature sets 150, according to the particular member, in the feature set information 190 in the index 184.

At operation 312, the index generator module 84 may remove feature information 151 from the feature sets 150. For example, the index generator module 84 may remove features 152 respectively associated with feature scores 154 that are less than a predetermined threshold.

At operation 314, the index generator module 84 may generate candidate signatures 162 based on the remaining feature information 151. For example, the index generator module 84 may generate a candidate signature set. 160 for each of the member information 122 in the corpus information 114. The candidate signatures 162 in the candidate signature set 160 may be generated from the feature set 150 for the particular member information 122. You may recall that a candidate signature 162 may include an individual feature 152 or a combination of consecutive features 152 to form a new candidate signature 162.

At operation 316, the index generator module 84 may generate candidate signature scores 164 for each of the candidate signatures 162. The index generator module 84 may generate candidate signature scores 164 according to the coverage of the associated candidate signature 162 over the corresponding member information 122 (e.g., product). For example, the index generator module 84 may generate a candidate signature score 164 by summing the feature scores 154 associated with each of the features 152 in the candidate signature score 164 and dividing by the sum of feature scores 154 that cover the entire member information 122 (e.g., product).

At operation 318, the index generator module 84 may remove candidate signature information 151 from the respective candidate signature sets 160. For example, the index generator module 84 may remove candidate signatures 162 from each of the candidate signature sets 160 that are associated with a candidate signature score 164 less than a predetermined threshold.

At operation 322, the index generator module 84 may identify index signatures 172 for each member information 122 (e.g., product) in the corpus information 114. The index generator module 84 may identify index signatures 172 for a particular member information 122 (e.g., product) by removing candidate signatures 162 from the candidate signature set 160 for the particular member information 122 (e.g., first plurality of candidate signatures) that also appears in candidate signature sets 160 for the remaining member information 122 (e.g., second plurality of candidate signatures). Accordingly, the remaining candidate signatures 162 are designated index signatures 172 because the candidate signatures signify the particular member (e.g., product) by being unique to the particular member.

At operation 324, the index generator module 84 may store the index signatures 172 that are used to signify the particular member in association with index signatures scores 174 as index signature set information 192 in the index 184. For example, the processing module 88 may store an index signature set 170 in the index 184 for each of the member information 122 in the corpus information 114.

Figure 13:
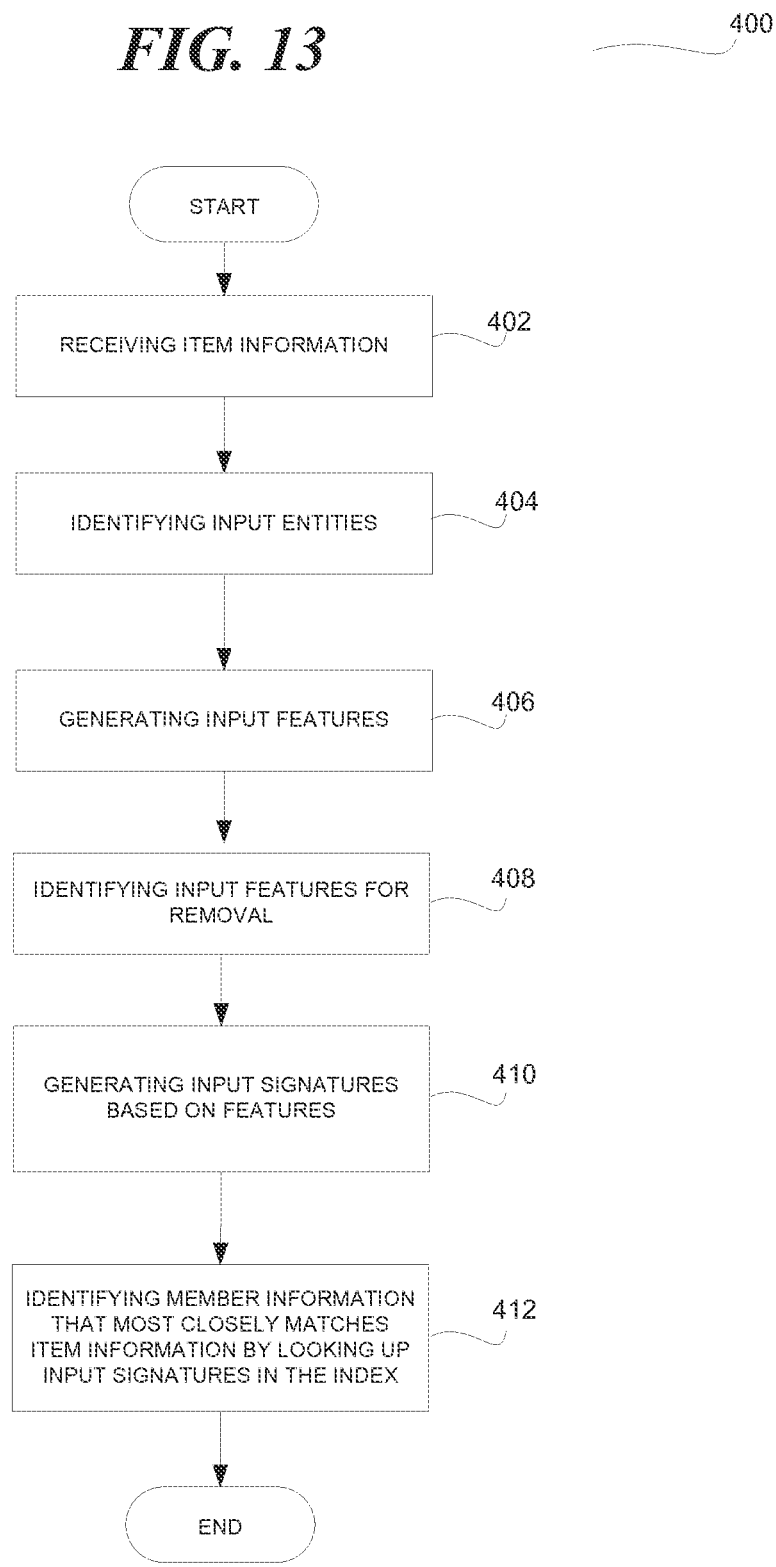
FIG. 13 is a block diagram illustrating a method, according to an embodiment, to utilize an index to identify a closest match.

FIG. 13 is a block diagram illustrating method 400, according to an embodiment, to utilize an index to identify a closest match. The method 400 commences at operation 402 with the receiving module 86 receiving input information 121 (e.g., listing) for matching against member information 122 (e.g., products) in corpus information (e.g., catalog of products). For example, the input information 121 may include a title, description, or other information for a listing of an item or service that is offered for sale on a network-based marketplace 12. At operation 404, the processing module 88 may parse the input information to identify (e.g., tokenize) one or more input entities 202, as previously described.

At operation 406, the processing module 88 may generate input features 204 based on the input entities 202. For example, the processing module 88 may generate input features 204 of one input entity 202 or by combining multiple input entities 202. In one embodiment, the input features 204 may include input entities 202 that are consecutively occurring in the input information 121. At operation 408, the processing module 88 may identify whether to remove an input feature 204 that was previously identified in the input information 121. For example, the processing module 88 may utilized the input feature 204 to look up a matching feature 152 in the feature set information 190 of the appropriate index 184. If the processing module 88 does not identify a matching feature 152, then the input feature 204 is removed. At operation 410, the processing module 88 may utilize the remaining input features 204 to generate input signatures 206. For example, the processing module 88 may generate input signatures 206 of one input feature 204 or by combining multiple input features 204. At operation 412, the processing module 88 may identify member information 122 (e.g., product) in the corpus information 114 (e.g., catalogue of products) that most closely matches the input information 121. For example, the processing module 88 may utilize the input signatures 206 to look-up matching index signatures 172 in the index signature set information 192 of the appropriate index 184. The processing module 88 may identify the index signature 172 that is most closely matched from the index signatures 172 based on the index signature scores 174 associated with the index signatures that were previously identified as matched. For example, the processing module 88 may identify a particular index signature 172 as most closely matched because the associated index signature scores is the highest index signature score 174. In one embodiment, the processing module 88 may identify the index signature 172 that is next most closely matched based on the next highest index signature score 174, and so on.

Figure 14:
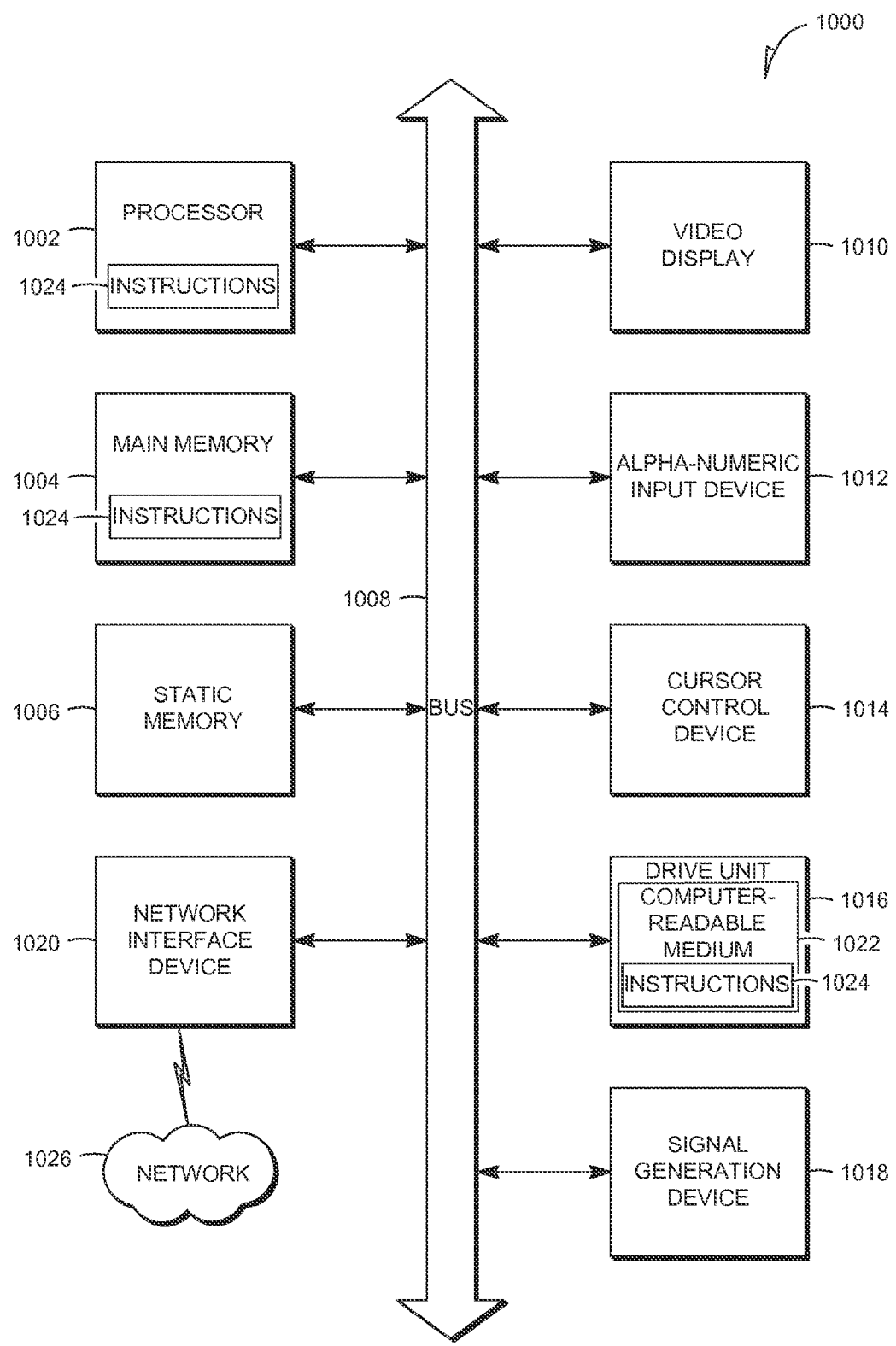
FIG. 14 is a block diagram of a machine, according to an example embodiment, including instructions to perform any one or more of the methodologies described herein.

FIG. 14 is a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (CPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, with the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Certain example embodiments may facilitate reduced processor loading, faster processor operation, reduced network traffic, and reduced data storage. For example, limiting an index to n-grams that are identified to be "index signatures" contributes towards reduced data storage, as previously mentioned. The reduced data storage, in turn, contributes towards reduced processor loading and faster processor operation, because the index is optimized for runtime computations. Finally, the utilization of "index signatures" increases the precision of the search results contributing towards fewer searches because the search results are more precise thus reducing network traffic. Further for example, the removal of features associated with feature scores below a predetermined threshold and the removal of candidate signatures associated with candidate signatures scores below a predetermined threshold also contribute towards reduced data storage leading to the reduced processor loading, faster processor operation, and reduced network traffic as mentioned above.

Modules, Components and Logic

Certain embodiments are described herein as including logic or a number of modules, components or mechanisms. A module, logic, component or mechanism (herein after collectively referred to as a "module") may be a tangible unit capable of performing certain operations and configured or arranged in a certain manner. In example embodiments, one or more computer systems (e.g., a standalone, client or server computer system) or one or more components of a computer system (e.g., a processor or a group of processors) may be configured by software an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The invention claimed is:

1. A system to generate an index for a closest match search, the system comprising:
 a processor;
 a memory in data communication with the processor for storing information;
 a corpus processing module executable by the processor that is operable to access a corpus of information that includes a plurality of member information, the plurality of member information includes first member information that describes a first member and other member information that describes other members; and
 an index generating module executable by the processor that is operable to generate a plurality of candidate signatures based on the corpus of information, the plurality of candidate signatures is respectively associated with a plurality of candidate signature scores, the index generator module to remove candidate signatures from the plurality of candidate signatures to generate a filtered plurality of candidate signatures, the index generator module to remove the candidate signatures based on an identification of candidate signature scores that corresponds to candidate signatures that are below a predetermined threshold, the candidate signature scores including a first candidate signature score, the first candidate signature score representing a percentage of coverage of the first signature over the first member information, the index generating module to identify a plurality of index signatures based on the filtered plurality of candidate signatures, the plurality of index signatures include a first plurality of index signatures, the first plurality of index signatures to signify the first member and not any one of the other members, the index generating module to store the first plurality of index signatures in an index, the storage of the first plurality of index signatures to enable a closest match of input information to at least one of the first plurality of index signatures to identify a closest match of the input information to the first member over the other members.

2. The system of claim 1, wherein the first candidate signature includes a plurality of features that respectively correspond to a plurality of feature scores and wherein the first candidate signature score is based on a summation of the plurality of feature scores.

3. The system of claim 1, wherein the index generating module is to compare the first plurality of candidate signature scores with a predetermined threshold.

4. The system of claim 1, wherein the first plurality of index signatures includes a plurality of features, wherein the plurality of features includes a first feature of the first member.

5. The system of claim 4, wherein the first feature includes at least one entity, wherein the at least one entity includes a first entity that includes a string of text that is included in the first member information and delimited from other strings of text that are included in the first member information.

6. The system of claim 1, further comprising:
 a receiving module that is operable to receive listing information that includes the input information; and
 a processing module that is operable to identify a closest match of the input information to at least one of the plurality of index signatures to identify a closest match of the input information to the first member over the other members.

7. The system of claim 6, wherein the input information is selected from a group of input information consisting of a string of text and a string of text with at least one name-value pair.

8. The system of claim 6, wherein listing information is for a listing that describes an item for sale on a network-based marketplace, and wherein the input information includes a title of the listing that describes the item for sale on the network-based marketplace.

9. The system of claim 8, wherein the corpus information includes a catalogue of products for sale on the network-based marketplace and wherein the first member includes a first product for sale on the network-based marketplace.

10. A computer-implemented method to generate an index for a closest match search, the method comprising:
 receiving a corpus of information including a plurality of member information, the plurality of member information including first member information that describes a first member and other member information that describes a plurality of other members;
 using a data processor to generate a plurality of candidate signatures based on the corpus of information, the plurality of candidate signatures respectively being associated with a plurality of candidate signature scores;
 removing candidate signatures from the plurality of candidate signatures to generate a filtered plurality of candidate signatures, the removing being based on an identification of candidate signature scores that correspond to the candidate signatures that are below a predetermined threshold, the candidate signature scores including a first candidate signature score, the first candidate signature score representing a percentage of coverage of the first signature over the first member information;
 identifying a plurality of index signatures based on the filtered plurality of candidate signatures, the plurality of index signatures including a first plurality of index signatures, the first plurality of index signatures to signify the first member and not any of the plurality of other members; and
 storing the first plurality of index signatures in the index, the storing to enable a closest match of input information to at least one of the first plurality of index signatures to identify a closest match of the input information to the first member over the plurality of other members.

11. The method of claim 10, wherein the first candidate signature includes a plurality of features that respectively correspond to a plurality of feature scores and wherein the first candidate signature score is based on a summation of the plurality of feature scores.

12. The method of claim 10, wherein identifying the plurality of index signatures further includes comparing the first plurality of candidate signature scores with a predetermined threshold.

13. The method of claim 10, wherein the first plurality of index signatures includes a plurality of features, wherein the plurality of features includes a first feature of the first member.

14. The method of claim 13, wherein the first feature includes at least one entity, wherein the at least one entity includes a first entity that includes a string of text that is included in the first member information and delimited from other strings of text that are included in the first member information.

15. The method of claim 10, further including:
receiving listing information that includes the input information;
identifying a closest match of the input information to at least one of the plurality of index signatures to identify a closest match of the input information to the first member over the other members.

16. The method of claim 15, wherein the input information is selected from a group of input information consisting of a string of text and a string of text with at least one name-value pair.

17. The method of claim 15, wherein listing information is for a listing that describes an item for sale on a network-based marketplace, and wherein the input information includes a title of the listing that describes the item for sale on the network-based marketplace.

18. The method of claim 17, wherein the corpus information includes a catalogue of products for sale on the network-based marketplace and wherein the first member includes a first product for sale on the network-based marketplace.

19. A machine-readable medium storing instructions that, when executed by at least one processor, cause the at least one processor to perform the following actions:
receiving a corpus of information including a plurality of member information, the plurality of member information including first member information that describes a first member and other member information that describes a plurality of other members;
using a data processor to generate a plurality of candidate signatures based on the corpus of information, the plurality of candidate signatures respectively being associated with a plurality of candidate signature scores,
removing candidate signatures from the plurality of candidate signatures to generate a filtered plurality of candidate signatures, the removing being based on an identification of candidate signature scores that correspond to the candidate signatures that are below a predetermined threshold, the candidate signature scores including a first candidate signature score, the first candidate signature score representing a percentage of coverage of the first signature over the first member information;
identifying a plurality of index signatures based on the filtered plurality of candidate signatures, the plurality of index signatures including a first plurality of index signatures, the first plurality of index signatures to signify the first member and not any of the plurality of other members; and
storing the first plurality of index signatures in the index, the storing to enable a closest match of input information to at least one of the first plurality of index signatures to identify a closest match of the input information to the first member over the plurality of other members.

20. A system to generate an index for a closest match search, the system comprising:
at least one processor;
a first means for accessing a corpus of information including a plurality of member information, the plurality of member information including first member information that describes a first member and other member information that describes other members; and
an index generating module executable by the processor that is operable to generate a plurality of candidate signatures based on the corpus of information, the plurality of candidate signatures is respectively associated with a plurality of candidate signature scores, the index generator module to remove candidate signatures from the plurality of candidate signatures to generate a filtered plurality of candidate signatures, the index generator module to remove the candidate signatures based on an identification of candidate signature scores that corresponds to candidate signatures that are below a predetermined threshold, the candidate signature scores including a first candidate signature score, the first candidate signature score representing a percentage of coverage of the first signature over the first member information, the index generating module to identify a plurality of index signatures based on the filtered plurality of candidate signatures, the plurality of index signatures include a first plurality of index signatures, the first plurality of index signatures to signify the first member and not any one of the other members, the index generating module to store the first plurality of index signatures in an index, the storage to enable a closest match of input information to at least one of the first plurality of index signatures to identify a closest match of the input information to the first member over the other members.

* * * * *